US006542163B2

United States Patent
Gorbet et al.

(10) Patent No.: US 6,542,163 B2
(45) Date of Patent: *Apr. 1, 2003

(54) METHOD AND SYSTEM FOR PROVIDING RELEVANT TIPS TO A USER OF AN APPLICATION PROGRAM

(75) Inventors: David P. H. Gorbet, San Francisco, CA (US); Robert M. Nixon, Palo Alto, CA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,248

(22) Filed: May 5, 1999

(65) Prior Publication Data

US 2002/0126140 A1 Sep. 12, 2002

(51) Int. Cl.[7] ................................................. G06F 3/14
(52) U.S. Cl. ........................ 345/711; 345/715; 345/708; 345/808; 345/846
(58) Field of Search ................................. 345/711, 708, 345/709, 710, 705, 715, 808, 809, 811, 812, 846, 765, 768, 730, 707; 707/512

(56) References Cited

U.S. PATENT DOCUMENTS

| 5,287,448 | A | * | 2/1994 | Nicol et al. ................. 345/707 |
| 5,546,521 | A | * | 8/1996 | Martinez ..................... 345/711 |
| 5,640,522 | A | * | 6/1997 | Warrin ......................... 395/346 |
| 5,682,469 | A | | 10/1997 | Linnett et al. .............. 345/473 |
| 5,978,595 | A | * | 11/1999 | Tanaka et al. .......... 345/708 X |
| 5,995,101 | A | * | 11/1999 | Clark et al. ................. 345/711 |
| 6,078,935 | A | * | 6/2000 | Nielsen .................. 345/711 X |
| 6,222,539 | B1 | * | 4/2001 | Watts ......................... 345/708 |
| 6,452,607 | B1 | * | 9/2002 | Livingston ................. 345/705 |

* cited by examiner

*Primary Examiner*—Raymond J. Bayerl
(74) *Attorney, Agent, or Firm*—Christensen O'Connor Johnson Kindness PLLC

(57) ABSTRACT

A facility for a presentation program displays unobtrusive, context-sensitive and customizable tips for a user of a program. Event and state are two types of tip conditions that will cause the facility to display a tip icon and/or a tip message window. Events are created by an action or series of actions. State conditions may be related to the state of the program and they are usually detected when the user has not used the application for a predetermined period of time. The tip icon is usually disposed adjacent to the object that triggered the tip condition. Generally, a tip message window (tip balloon) is only displayed if the user has selected the tip icon for the tip condition. However, if the tip condition has a high priority value, then the tip message window may be immediately displayed without the tip icon.

40 Claims, 14 Drawing Sheets

METHOD AND SYSTEM FOR PROVIDING RELEVANT TIPS TO A USER OF AN APPLICATION PROGRAM

FIELD OF THE INVENTION

The present invention generally relates to displaying helpful information to a user of a computer application program, and more particularly, to a method and a system for displaying context sensitive tips in an unobtrusive manner to the user.

BACKGROUND OF THE INVENTION

A computer application program often has an associated data file that is processed during the normal execution of the application program. The data file may contain information that is processed for presentation to a user as a video and/or audio performance. A presentation program is one example of a computer application program that processes an associated data file.

A presentation program enables a user to create, edit, manage, and perform "slide show presentations" on a computer. One example of a popular presentation program is "PowerPoint," which is available from the Microsoft Corporation, of Redmond, Wash. A slide show presentation includes a set of electronic "slides," each slide corresponding to one screen or page of output. An electronic slide may also be converted to a 35 mm or overhead transparency for display in a standard slide projector or overhead projector. Each slide may contain one or more objects, such as text, graphic images, graphic automation and animations. A slide may also include a sound object or video that is played when the slide is displayed during a slide show presentation. A presentation program "performs" a slide show by sequentially displaying a series of slides contained within the slide show presentation. The slides are displayed on a computer screen or projected onto a separate surface. During a performance of a slide show, a "presenter" controls the performance by invoking commands to "advance" to the next slide. A command can be entered using a keyboard, a mouse, or another suitable input device. Alternatively, an author of a slide presentation can associate a slide "timing" with each slide. A slide timing associated with a slide indicates the number of seconds that the slide is displayed before the presentation program automatically advances to the next slide in the slide show presentation. In this way, during the performance of the slide show presentation, the presentation program will automatically advance to the next slide when the existing slide's timing ends. Also, the sequence for displaying the slides in the slide show is determined by the author of the slide show presentation. However, during the performance of the slide show presentation, a presenter may enter commands to the presentation program that will change the sequence for displaying the slides.

Each user of a presentation program may have varying levels of proficiency with different features. For example, one user of the presentation may be familiar with commands for displaying the slide show presentation to others and another user may be versed in commands for authoring the content in a slide. Also, each user's skill at entering information in a computer may vary. Thus, there is a need to provide access to help information so that a user may learn new features and understand how to more effectively use known features of the presentation program.

Different types of help facilities have been available throughout the history of computer applications. These help facilities have improved from command line displays of plain text to interactive and graphical help facilities, such as the Microsoft Corporation's "Office Assistant" facility. The "Office Assistant" is a help facility incorporated into the Microsoft Corporation's "Office 97" suite of application programs for displaying help and/or advisory messages to the user in a standard graphical user interface format, rather than each application in the suite having its own separate format to provide helpful information.

One portion of the "Office Assistant" facility, hereinafter the OA facility, generates the content of the tips that are graphically displayed to a user. Previously, the OA facility did not generate helpful tips that were context sensitive and the facility did not enable the user to select the type of tips, the obtrusiveness of the tips, the relevance of the tips, or customize how the tips were displayed. Also, the tips displayed by the OA facility have been oriented to explaining a feature and did not provide the user with the option of having the facility automatically complete an attempted task. The present invention is directed to solving the problem of providing relevant tips in an unobtrusive, task-oriented, and customizable manner to the user along with the option of automatically completing the attempted task.

SUMMARY OF THE INVENTION

In accordance with the present invention, a method for automatically displaying a tip for a condition detected in a computer application program, such as a presentation program, is provided. The method includes: (1) detecting the occurrence of the condition in the application program; (2) determining that the condition is associated with the tip; (3) determining that the tip is relevant to the current use of the application program by a user; (4) displaying a relevant tip message that is associated with the condition, so that the condition may be acknowledged by the user; and (5) responding to the user's acknowledgment of the tip message in an appropriate way, which may include invoking code in the application to automatically complete the user's task. A type and a priority is identified for each condition associated with a tip.

In accordance with other aspects of this invention, there are at least two types of tip conditions, i.e., event and state. An event based tip condition is usually associated with an action or a series of actions and a state based tip condition is often associated with the state of the application program.

In accordance with other aspects of the present invention, each type of tip condition has a priority value associated with the tip condition e.g., low, medium and high. For a high priority tip condition, the present invention will immediately display a tip message associated with the tip condition. When a low priority tip condition occurs, the present invention may display a selectable graphic image associated with a tip message for the condition.

In accordance with further aspects of the present invention, a graphic image may be displayed at a location adjacent to an object corresponding to a tip condition that does not have a high priority value. Selecting the graphic image causes a tip message associated with the condition to be displayed and the display of the graphic image to be removed. The graphic image may be translucent and/or an icon. The graphic image is generally sized equal to or greater than a minimum non-obtrusive size and large enough so that the user can view and select the graphic image. When a tip condition does not correspond to an object, the graphic image may be disposed at a default position in the display.

In accordance with still other aspects of this invention, event and state conditions may be associated with an action or series of actions that have a high priority which will cause the invention to immediately display a tip message to the user without first displaying the graphic image.

In accordance with still further aspects of this invention, the event and state conditions may be associated with an action or series of actions that have a medium priority that may cause the immediate display of the graphic image.

In accordance with yet other aspects of this invention, a state condition may be associated with a state of the application program that will cause the display of the graphic image when the application program is idle for a predetermined time interval.

In accordance with yet further aspects of this invention, a description may be displayed with the tip message indicating how to perform a task that will correct the condition associated with the tip. The display of the tip message may be disabled.

In accordance with yet still other aspects of this invention, a type of the condition may be disabled so that a tip message associated with the disabled type of condition will not be displayed. Further, a category for the condition may be selected, e.g., edit, style and clip art, and the category may be disabled so that a tip message associated with the category of the condition will not be displayed.

In accordance with the aspects of this invention, the state condition tips are rechecked each time a displayed object is changed.

In accordance with yet still other aspects of this invention, a user profile may be provided that includes a user proficiency level, a list that identifies each application program available to the user and a list identifying previous help requests of the user. Preferably, a tip message for a low priority tip condition is displayed when a current speed of the user is not greater than an average speed by a predetermined difference.

In accordance with yet other further aspects of this invention, the user profile is employed to determine when the tip associated with the condition is relevant to the user.

In accordance with yet still further aspects of the present invention, an idle loop method for the state type of condition provides for style checking and clip art checking. Also, the event type of condition includes changes to a displayed object and printing errors.

In accordance with still further other aspects of this invention, a control may be displayed with a tip message that provides for the automatic correction of the condition associated with the tip. When the control is selected, the condition is automatically corrected and the tip message is removed from the display.

In accordance with additional aspects of this invention, another control may be displayed with the tip message that provides for the display of additional help information associated with the condition. The other control may be displayed concurrently with the control for automatically correcting the condition associated with the tip. When the other control is selected, the additional help information is displayed.

In accordance with further aspects of the present invention, a preview, e.g., a thumbnail, may be displayed that illustrates the effect of changes that will be made if the user selects the automatic correction of the condition associated with tip.

In accordance with other aspects of the present invention, text that identifies the type of the condition may be displayed when a pointing mechanism is positioned over the graphic image associated with the condition for the tip. This invention may also provide for a control that causes the simultaneous display of every relevant tip message associated with the current condition of the application program. The control may provide for selecting the display of relevant tip messages according to type and/or priority.

In accordance with other aspects of this invention, a control may be provided for automatically correcting a plurality of conditions associated with a relevant tip message. Additionally, this invention may provide for delaying the display of the graphic image for a determined time interval.

In accordance with yet additional aspects of the present invention, a system which implements substantially the same functionality in substantially the same manner as the method described above is provided.

In accordance with other additional aspects of this invention, a computer-readable medium that includes computer-executable instructions may be used to perform substantially the same method as that described above is provided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
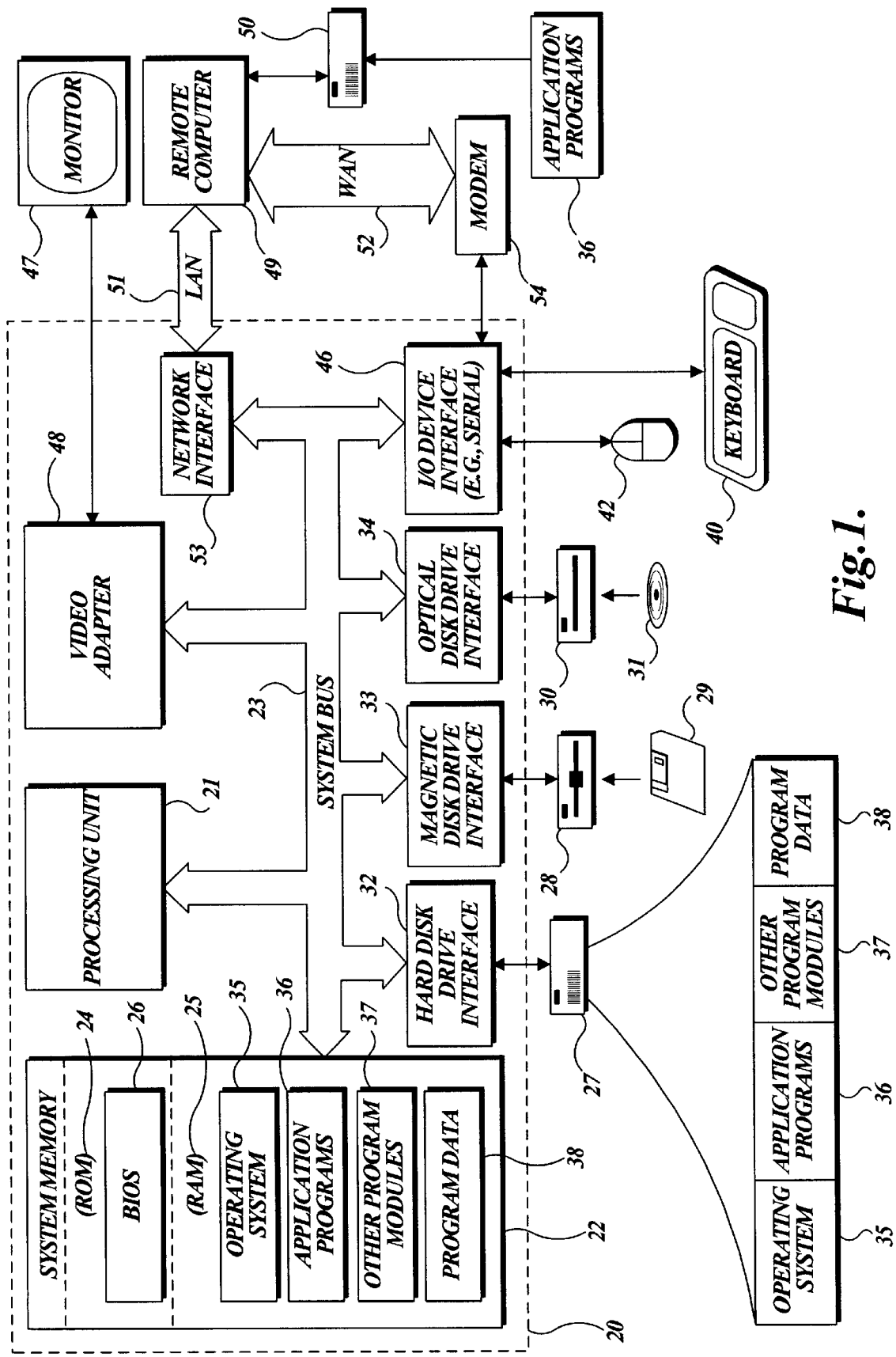
FIG. 1 is a block diagram of a general purpose computer system suitable for implementing the present invention.

The present invention is directed to providing a "Presentation Assistant" facility suitable for integration with an OA facility to provide relatively unobtrusive and relevant tips that are customizable and task-oriented for the creation and editing of a document. The "Presentation Assistant" facility (hereinafter the PA facility) automatically detects the proficiency level of the user, determines the urgency of providing a relevant tip for an event and/or state, determines the relevance of the tip to the entire document, and enables the user to customize the displayed tips.

The PA facility causes an application program running the OA facility to display a graphic image of a tip icon, e.g., a light bulb, adjacent to a displayed object that is relevant to a low priority condition associated with the tip. When the user selects the tip icon, the graphical user interface of the OA facility will display the relevant tip to the user. Where appropriate, the relevant tip will include an option for the user to select the automatic completion of a suggested task to correct the condition associated with the tip. In some cases, the PA facility will determine that a particular condition associated with the tip, is so urgent (high priority) and/or relevant that the tip icon will not be displayed. Instead, the OA facility's graphical user interface will immediately display the tip associated condition. Some of the categories of tips used with the PA facility comprise usage, style and clip art selection (auto clip art). Additionally, the display of the tip icon may be delayed for at least one second, so that the icon will not flash off and on when the user is editing a displayed object.

There are at least three different types of detection methods employed to determine a condition associated with a relevant tip for the condition. For example, most style and clip art tips are determined by an idle loop processing method which executes when the user has not used the application program for a determined period of time, e.g., 100 milliseconds. Another method detects a trigger such as a user action or series of actions to determine a tip and yet another method determines tips based on when an event occurs. Also, a prioritized list may be employed in the idle loop processing method so that the present invention will position the tip icon adjacent to the object associated with the highest priority on the list. Also, the lowest priority tip conditions are usually associated with the idle loop method.

The present invention recognizes at least two types of conditions associated with a tip, i.e., event and state. Each type of tip condition may have a different priority value such as low or high. For example, a high priority tip condition may cause the present invention to immediately display a tip message window e.g., a tip balloon, when the high priority tip condition is detected. Alternatively, a low priority tip condition may cause the present invention to display the tip icon when the tip condition is detected.

An event based tip condition is typically caused by a trigger such as an action or a series of actions that are initiated by either the user or the application program. One example of a high priority event based tip condition is the attempted selection of an object on a master slide (typically two single clicks of a mouse button by the user) when a presentation application is currently displaying another slide that includes the selected object. In this case, the present invention would immediately display a tip balloon indicating that the selected object is actually disposed on the master slide instead of the currently displayed slide. The tip balloon might indicate that any editing of the selected object could affect every slide that is related to the master slide. Further, the tip balloon might provide a control for automatically correcting the high priority condition associated with the tip. Similarly, a high priority state based tip condition would occur when the present invention detects a low memory condition. The present invention would immediately display a tip balloon indicating to the user that a low memory condition has occurred.

A low priority event based tip condition occurs when the user disposes the same selected object on two different slides displayed by a presentation program instead of positioning the object on a master slide for the two slides. In this case, the present invention would cause a tip icon to be disposed adjacent to the position of the selected object in the currently displayed slide. The subsequent selection of the tip icon would cause the display of a tip balloon related to the low priority tip condition. Similarly, low priority state based tip conditions would occur when a font size is less than a minimum size and/or improper grammar/punctuation has been used with a text object. Another low priority state based tip condition could occur when the present invention recommends a clip art selection for use with a text object in a currently displayed slide.

Since the help window facility for the presentation application is another facility that is separate from the PA facility, the tip icon or the tip balloon may continue to be displayed when a help window is selected. The present invention enables each user to extensively customize the relevant tips that will be detected by the PA facility. Also, the number of times that a particular tip and/or suggested correction is displayed may be customized for each user. Although not shown, it is envisioned that the tip icon may be displayed in a translucent or ghosted manner so that the obtrusiveness of the PA facility is further reduced. It is also envisioned that the present invention could highlight all relevant portions of an object that would be automatically changed to correct an error if the user selects the control that automatically completes this task. For example, if completing the task meant changing some words in an object from title case to lower case, these words would be highlighted and other (not changed) object words would not be highlighted.

FIG. 1 and the following discussion are intended to provide a brief, general description of a suitable computing world in which the present invention may be implemented. Although not required, the invention will be described in the general context of computer-executable instructions, such as application modules, being executed by a personal computer. Generally, application modules include routines, applications, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing worlds where tasks are performed by remote processing devices that are linked through a communications network. In a distributed computing world, application modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, or a local bus using any of a variety of bus architectures. The system memory includes read-only memory (ROM) 24 and random access memory (RAM) 25.

A basic input/output system (BIOS) 26, containing the basic routines that help to transfer information between elements within the personal computer 20, such as during start-up, is stored in ROM 24. The personal computer 20 further includes a hard disk drive 32 for reading from and writing to a hard disk 27, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, aid an optical drive interface 34, respectively. The drives and their associated computer-readable media provide non-volatile storage of computer-readable instructions, data structures, application modules and other data for the personal computer 20. Although the exemplary world described herein employs a hard disk 27, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating world.

A number of application modules may be stored on the hard disk 27, magnetic disk 29, optical disk 31, ROM 24, or RAM 25, including an operating system 35, one or more application applications 36, other application modules 37, and application data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may also be connected by other interfaces, such as a parallel port, game port, or a universal serial bus (USB). A display 47 is also connected to the system bus 23 via an interface, such as a video adapter 48. One or more speakers (not shown) may also be connected to the system bus 23 via an interface, such as an audio adapter (not shown). In addition to the display and speakers, personal computers typical'y include other peripheral output devices (not shown), such as printers.

The personal computer 20 may operate in a networked world using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking worlds are commonplace in offices, enterprise-wide computer networks, intranets and the Internet.

When used in a LAN networking world, the personal computer 20 is connected to the local area network 51 through a network interface or adapter 53. When used in a WAN networking world, the personal computer 20 typically includes a modem 54 or other means for establishing communications over the wide area network 52, such as the Internet. The modem 54, which may be internal or external, is connected to the system bus 23 via the serial port interface 46. In a networked world, application modules depicted relative to the personal computer 20 or portions thereof, may be stored in the remote memory storage device. It will be appreciated that the network connections shown are exemplary, and other means of establishing a communications link between the computers may be used.

Figure 2A:
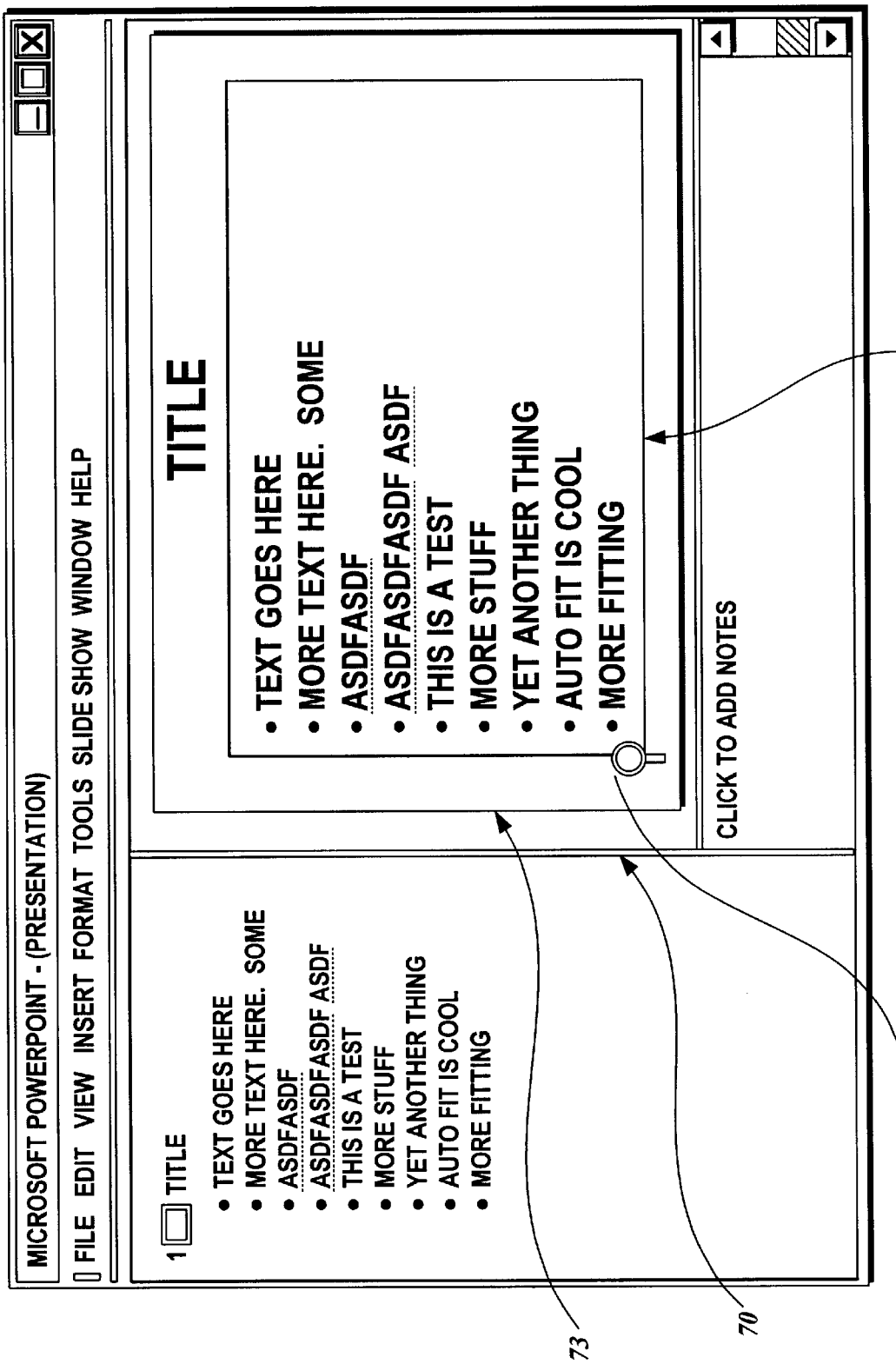
FIG. 2A illustrates a tip icon displayed adjacent to text being edited in a slide for a slide show presentation.
Figure 2B:
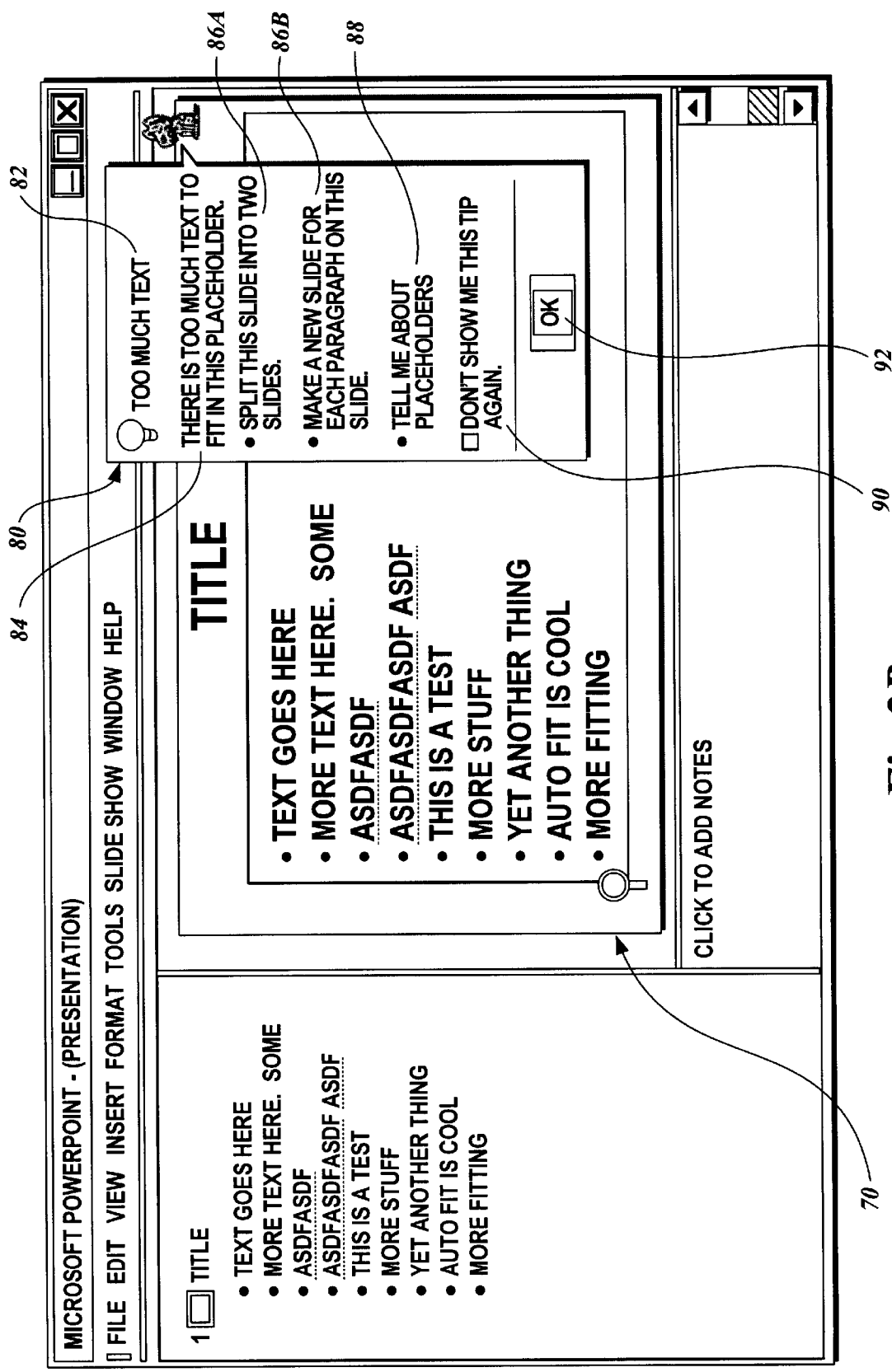
FIG. 2B shows a display of a tip message window associated with the text being edited in the slide for the slide show presentation shown in FIG. 2A.

FIGS. 2A and 2B are illustrative examples of a preferred embodiment of the present invention. While the examples described herein relate to slides in a presentation application, such as the "PowerPoint" application discussed above, it will be appreciated that the present invention may be applied to other types of applications including spreadsheets, editors and databases.

FIG. 2A illustrates a slide 70 and a tip icon 72 (light bulb) disposed adjacent to an active block of text 71. The tip icon 72 is relatively small compared to other objects on the slide 70, such as the text 71. A placeholder 73 encloses the block of text 71 and indicates that the text is selected for editing. The PA facility provides for only displaying one tip icon associated with a tip condition at a given time in the slide 70. In the present invention, different tips may be invoked in a variety of ways for display to a user. One way to invoke a tip is to monitor the occurrence of triggers for tip conditions, i.e., an action or a series of actions. When a trigger occurs, the PA facility will generate a tip for the tip condition and the OA facility will display the tip icon 72 at a location that is directly adjacent to the object associated with the tip condition. However, when there is no specific object related to a state for a tip condition, the tip icon 72 may be displayed at a "default" position, e.g., adjacent to a graphic image such as a cartoon that represents the OA facility.

In FIG. 2A, a tip condition for the slide 70 has caused the tip icon 72 to be displayed adjacent to an object, i.e., a block of text 71, that is associated with the tip condition. Although the tip icon 72 shown in FIG. 2A is a graphic image represented as a light bulb, it will be appreciated that other graphic images for tip icons may be used for substantially the same purpose. Since the tip icon 72 is sized relatively small compared to the other objects in the slide 70, the tip icon is informative without being unduly intrusive. Although not shown, it is envisioned that the tip icon 72 may also be translucent to make it even more unobtrusive.

FIG. 2B is an exemplary illustration of a tip message window (tip balloon) 80 that is displayed by the OA facility when the tip icon 72 has been selected, e.g., by moving a cursor over the tip icon 72 and clicking the pointing device 42, or a high priority event has occurred. Some events can have a high priority and they are typically instances of a critical nature that require immediate user notification and which cause the tip balloon 80 to be automatically displayed without having first displayed the tip icon 72. For example, an error that occurs when a slide show presentation is being printed is treated as an event that must be immediately brought to the attention of the user.

It is further envisioned (although not shown) that the tip balloon 80 could be activated, i.e., displayed, when the user selects a keyboard element such as the "F1" key on a keyboard or a menu item in a separate help window. It is also envisioned that the selection of the "F1" key when the tip balloon 80 is displayed could be employed to toggle the current display of the tip balloon with another display of a separate default (home) help window. In this way, a user could access helpful information even when a tip condition has caused the display of the tip balloon 80. Also, the keyboard functionality would be useful to users with disabilities that impair their ability to employ a pointing device such as a mouse to select a graphic image, i.e., tip icon.

The tip balloon 80 shown in FIG. 2B illustrates a general tip format that is used to display a tip to a user. A descriptive title 82 is employed to indicate the subject of the tip which is followed by a brief summary 84 identifying the primary reason (problem) the OA facility is displaying the tip balloon 80, i.e., "there is too much text to fit in the placeholder." In this example, the tip balloon 80 is displaying action buttons 86A and 86B that offer two different choices for automatically correcting a condition associated with the tip e.g., either splitting the currently displayed slide into two slides or making a new slide for each paragraph in the currently displayed slide. When the user selects one of the action buttons 86A and 86B, the identified tip condition is automatically corrected in the chosen manner and the tip balloon 80 is immediately removed from the display. In this way, the identified problem is automatically corrected without the user having to learn/know the exact steps necessary to correct the tip condition. Additionally, when an "OK" button 92 is selected, the tip balloon 80 is closed without the user having to choose any of the other options (action buttons and/or check boxes) listed in the window.

Alternatively, the user may select another action button 88 to display additional help information about the identified problem. When the user selects the other action button 88, a help window facility will display additional help information in a separate help window (not shown) along with the continued display of the tip balloon 80. In this way, the user may learn details about the identified tip condition from the additional help information and still retain access to the action buttons 86A and 86B for automatically correcting the tip condition. For example, the user may want to display the additional help information again (in the case where the help window was inadvertently closed) or select the automatic correction of the tip condition. Although there is only one action button 88 shown in FIG. 2B for selecting additional help, it is envisioned that the tip balloon 80 may contain multiple action buttons for selecting different types of help information.

A check box 90 enables the user to disable the future display of the currently displayed tip balloon 80. The user may also disable the display of entire categories of tips (e.g. clip art), as well as individual tips. In one embodiment, if the user closes the tip balloon 80 without doing anything else besides selecting the "OK" button 92, the particular tip associated with the tip balloon will be automatically disabled.

FIGS. 3–11B are flow diagrams illustrating the logic used by the PA facility to indicate a tip by displaying tip icons and/or tip balloons in a presentation program. While described in a presentation program environment, it is to be understood that the PA facility formed in accordance with this invention may be used with other application programs such as editors, spreadsheets, word processors and databases.

Figure 3:
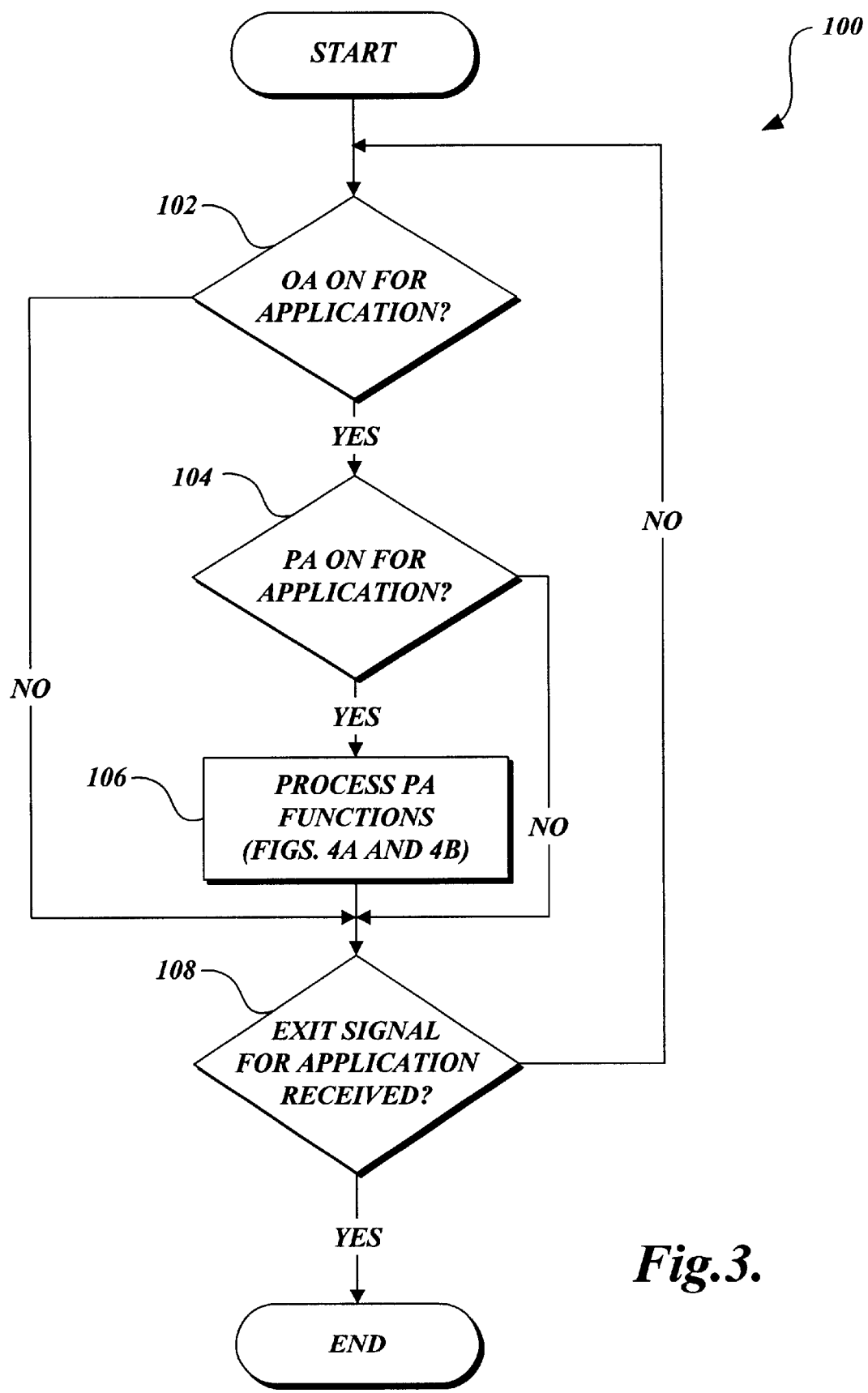
FIG. 3 is a flow diagram illustrating the main logic flow for indicating relevant tips to a user of a presentation application.

FIG. 3 is a flow diagram illustrating an overview 100 of the logic flow to determine conditions associated with relevant tips for an exemplary presentation program and provide a display that indicates the relevant tips to a user. When a presentation program that employs the present invention is activated, the logic will move from a start block to a decision block 102 where a test is made to determine if the OA facility is enabled for use with the presentation program. If true, the logic proceeds to a decision block 104 where a test is made to determine if the PA facility is enabled. Preferably, the PA facility is incorporated with the OA facility. Alternatively, if the determination at the decision block 102 is false, the logic proceeds to a decision block 108.

If the test at the decision block 104 determines that the PA facility is enabled for the presentation program, the logic will step to a block 106 where the functions associated with the PA facility are processed. The logic for processing the PA facility functions is illustrated in detail in FIGS. 4A and 4B. From the block 106, the logic flows to the decision block 108 where a test is made to determine whether an exit signal for the presentation program has been received. At the decision block 108, if the determination is true, i.e., the user has closed (initiated an exit signal) the presentation program, the logic will move to an end block and stop further execution of the present invention. However, if the determination at the decision block 108 is false, the logic will jump back to the decision block 102 and repeat substantially the same logical steps described above. Also, if the test at the decision block 104 had determined that the PA facility was not enabled, the logic would have jumped directly to the decision block 108.

Figure 4A:
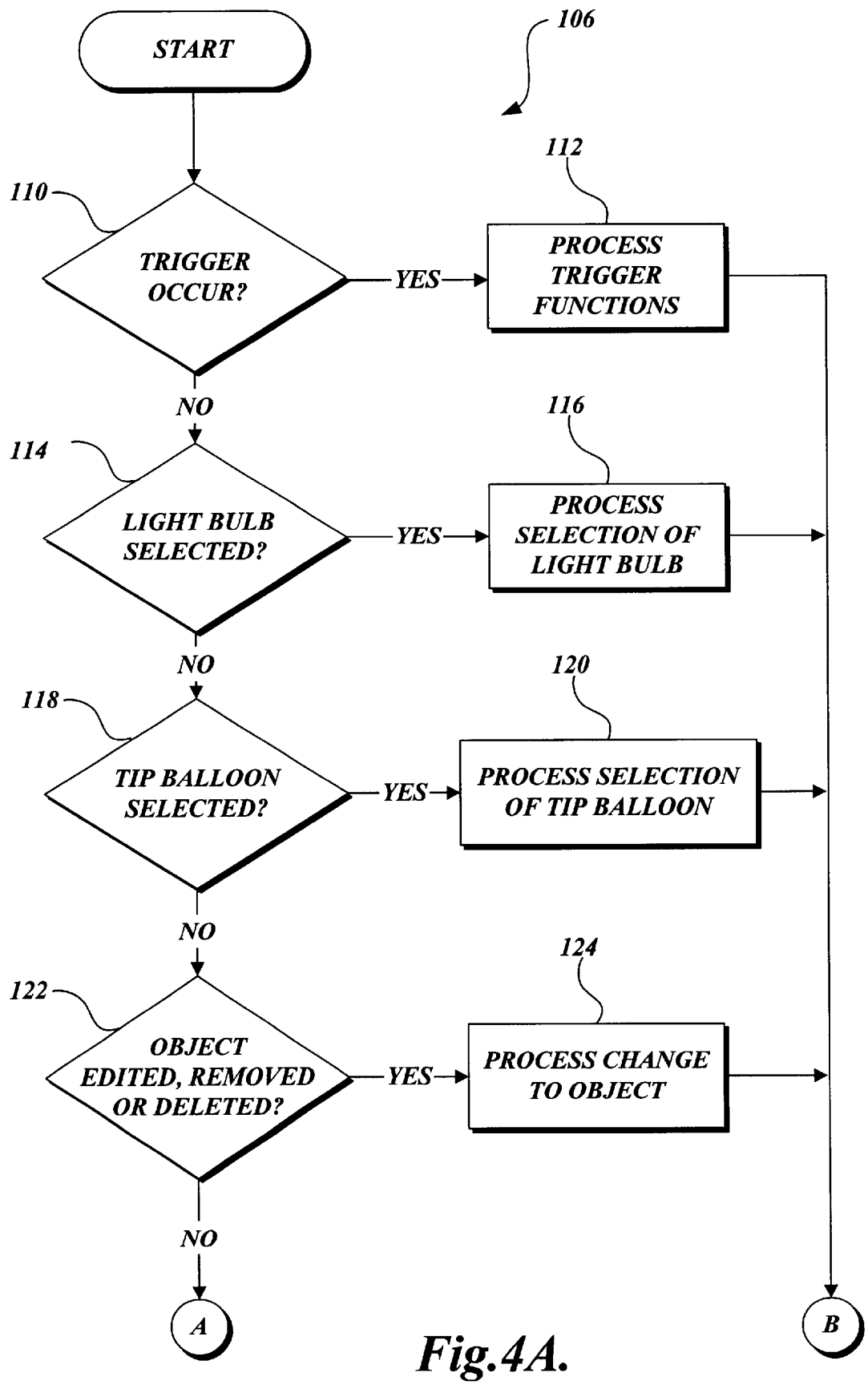
FIGS. 4A and 4B show a flow diagram illustrating in detail the logic for processing the "Presentation Assistant" facility as shown in FIG. 3.
Figure 4B:
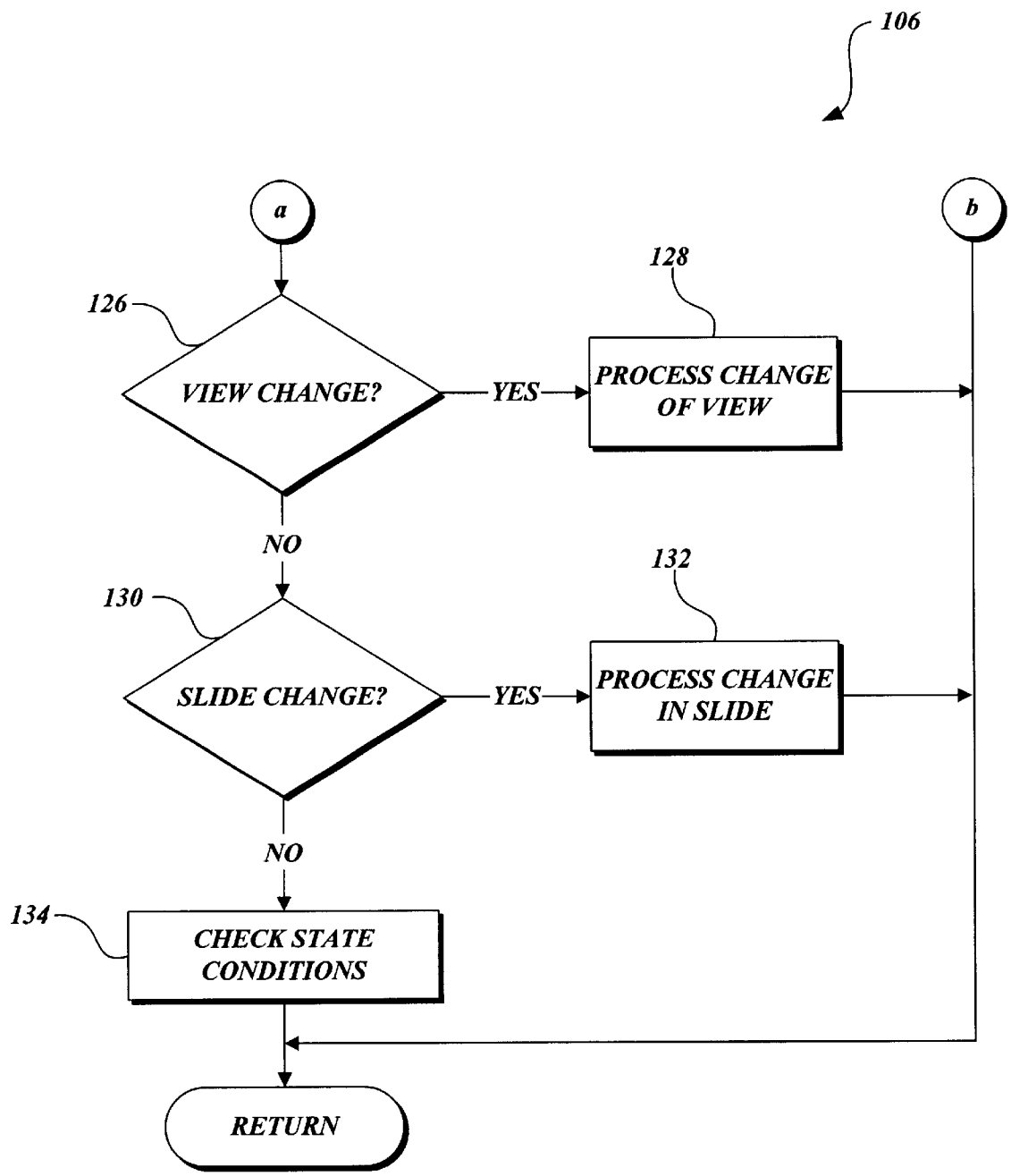
Figure 5:
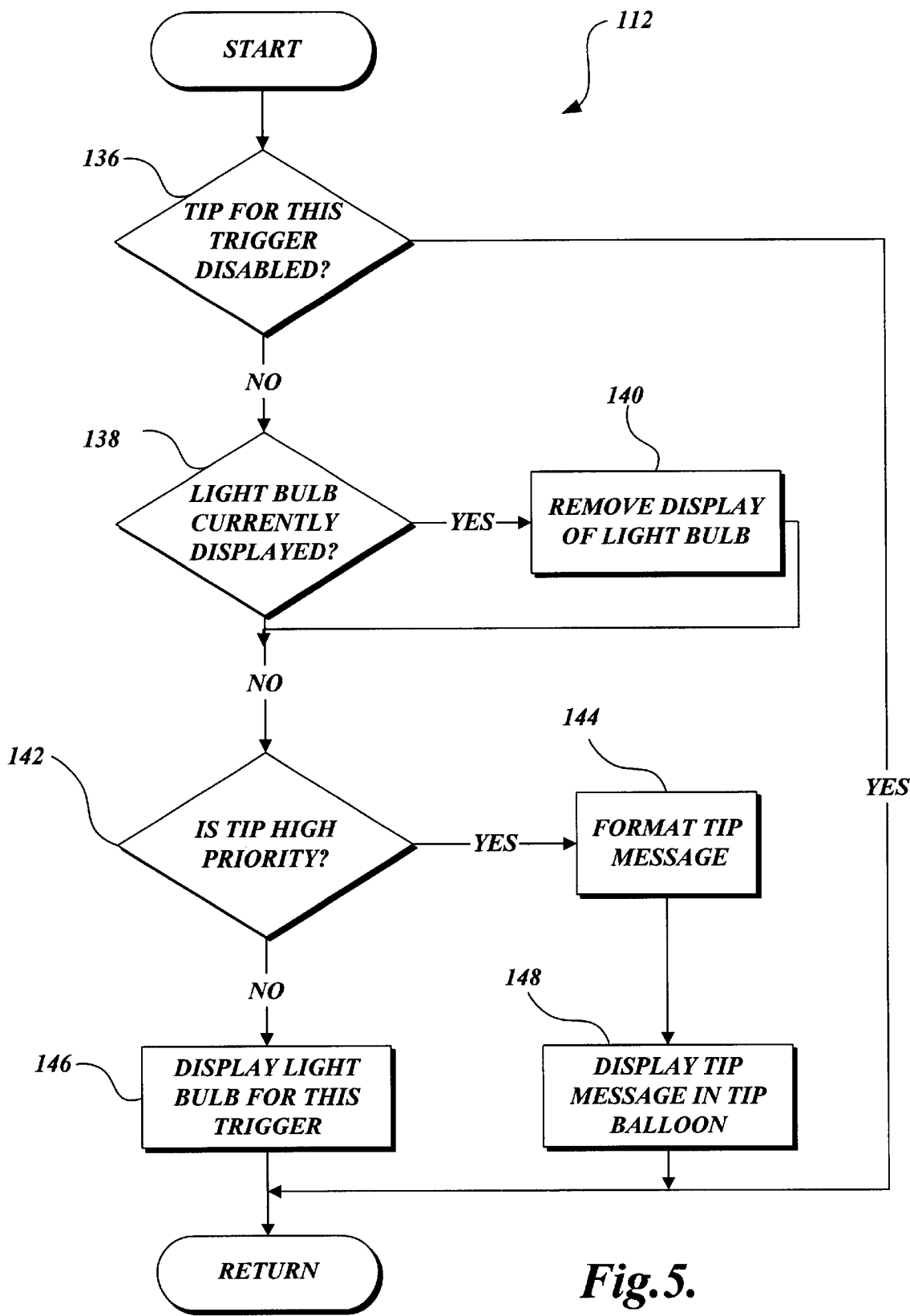
FIG. 5 is a flow diagram illustrating in detail the processing of trigger functions as shown in FIG. 4A.

FIGS. 4A and 4B illustrate in detail an overview of the logic employed at the block 106 (FIG. 3) to process the functions of the PA facility employed with the presentation program. In FIG. 4A, the logic moves from a start block to a decision block 110 where a test is made to determine if a trigger for an event or state based tip condition has occurred in the execution of the presentation program with the PA facility. If true, the logic steps to a block 112 and the functions of the PA facility for the trigger are processed. The logic for processing the functions associated with the trigger is illustrated in FIG. 5 and described below. Next, the logic moves from the block 112 to a return block where it resumes the main logic flow illustrated in FIG. 3.

Figure 6:
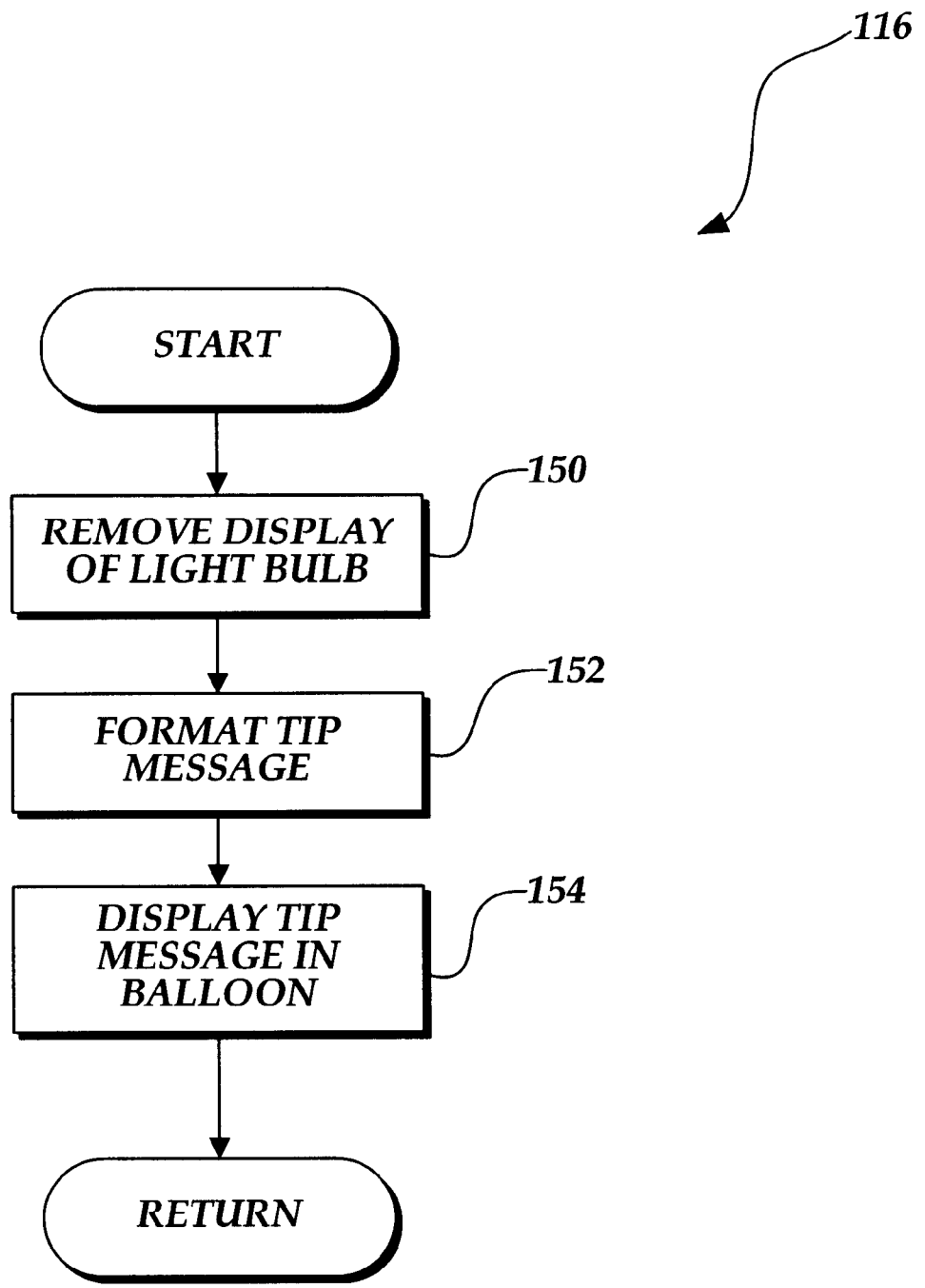
FIG. 6 is a flow diagram illustrating in detail the processing of the selection of a light bulb tip icon as shown in FIG. 4A.

Alternatively, if the determination at the decision block 110 was false, the logic would have advanced to a decision block 114 and a test would be made to determine if the display of a graphic image of a "light bulb" tip icon has been selected. If affirmative, the logic would step to a block 116 and process the functions of the PA facility associated with the selection of the light bulb tip icon. The logic for processing the selection of the light bulb tip icon is illustrated in FIG. 6 and described below. After completing the processing of the selected light bulb tip icon, the logic advances to the return block and resumes the main flow of logic as illustrated in FIG. 3.

Figure 7:
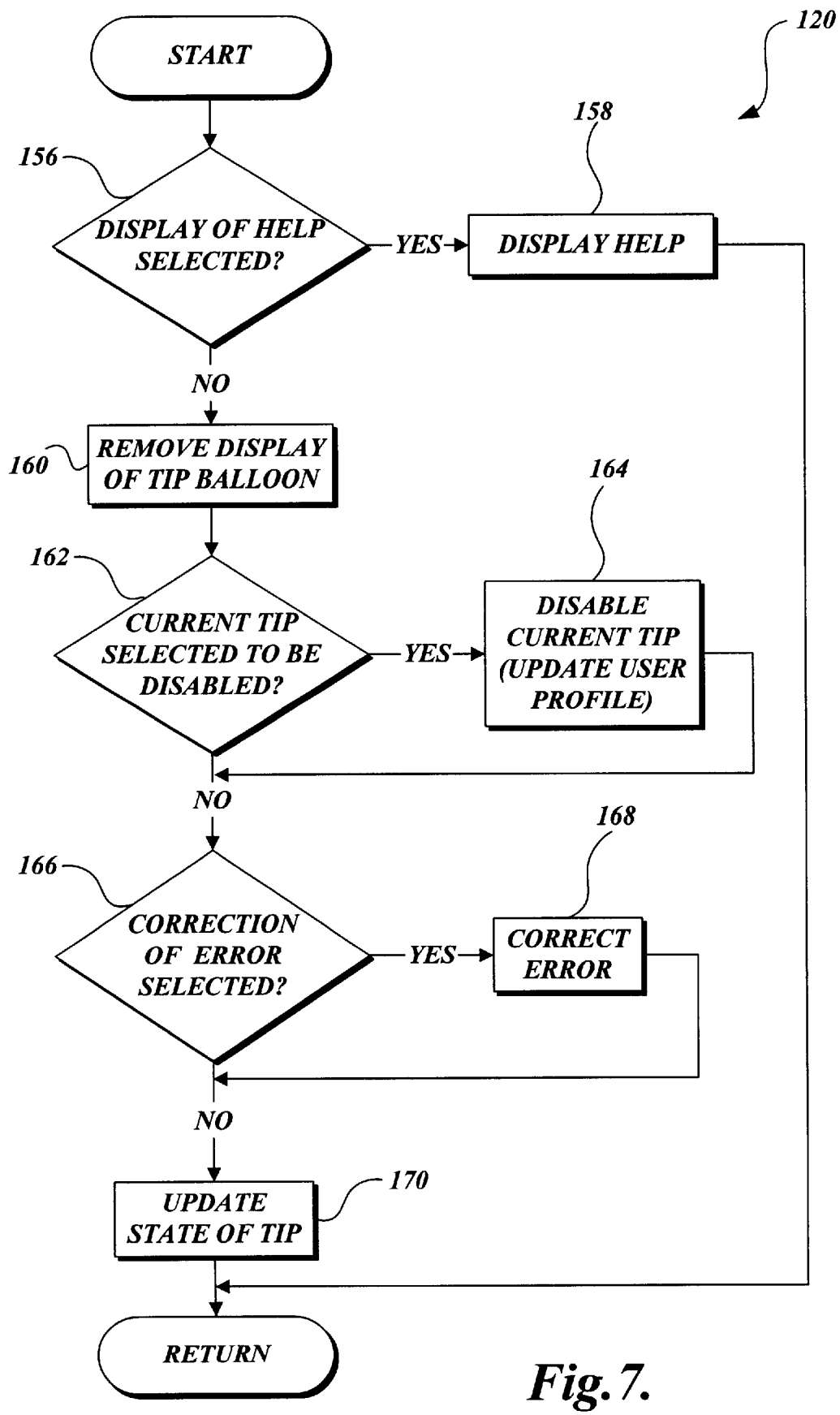
FIG. 7 is a flow diagram illustrating in detail the processing of the tip balloon as shown in FIG. 4A.

However, if the determination at the decision block 114 had been false, the logic would have flowed to a decision block 118 where a test would be performed to determine if a tip balloon was selected by the user. In the present invention, a tip balloon is a type of window that displays contextually related tips in a format that may also include action buttons and/or check boxes for automatically correcting the condition associated with the tip. If the outcome of the test at the decision block 118 is true, the logic moves to a block 120 and the selection of the tip balloon by the user is processed by the present invention. The logic for processing the selection of the tip balloon at the block 120 is illustrated in FIG. 7 and described below. Once the processing of the selected tip balloon is completed, the logic jumps to a return block and rejoins the main flow of logic as illustrated in FIG. 3.

In the alternative, if the determination at the decision block 118 was false, the logic would have moved to a decision block 122 where a test would be made to determine if any object displayed by the presentation program was changed, i.e., edited, removed or deleted. If so, the logic advances to a block 124 where the changes to the object are processed. The processing of the changed object at the block 124 is further illustrated in FIG. 8. Upon completion of the processing of the changed object at the block 124, the logic steps to the return block and resumes the main flow of logic as illustrated in FIG. 3.

However, if the determination at the decision block 122 was false, the logic would have flowed to a decision block 126 as shown in FIG. 4B. Moving to FIG. 4B, the overview 106 of the processing of the functions of the PA facility is continued at the decision block 126, where a test is made to determine if the current view of the displayed slide has changed. If true, the logic moves to a block 128 where a change to the current view of the displayed slide is processed by the present invention. The logic for processing a change of view at the block 128 is further illustrated in FIG. 9. After the processing at the block 128 is finished, the logic jumps to the return block and resumes the main logic flow as illustrated in FIG. 3.

Alternatively, if the determination at the decision block 126 was false, the logic would have moved to a decision block 130 where a test would be performed to determine if the current display had changed from the display of a previous slide to the display of another slide. If so, the logic moves to a block 132 where the changed display of the other slide is processed. The logic for processing the changed display at the block 132 is further illustrated in FIG. 10. Upon completion of the processing at the block 132, the logic jumps directly to the return block and resumes the main logic flow as illustrated in FIG. 3.

However, if the determination at the decision block 130 was false, the logic would have flowed to a block 134 where the state tip conditions for the currently displayed slide would be checked. The logic for processing the state tip conditions at the block 134 is illustrated in greater detail in FIGS. 11A and 11B. After the state tip conditions are checked at the block 134, the logic advances to the return block and rejoins the logical steps illustrated in FIG. 3.

Looking to FIG. 5, the processing of an event based (trigger) tip condition at the block 112 (shown in FIG. 4A) is illustrated in greater detail. Moving from a start block, the logic flows to a decision block 136 where a test determines if the trigger for the associated tip condition is disabled. If so, the logic jumps to a return block and resumes the logic flow illustrated in FIG. 4A. However, if the determination at the block 136 was false, the logic will advance to a decision block 138.

At the decision block 138, a test is made to determine if the light bulb tip icon is currently displayed to the user. If true, the logic steps to a block 140 where the display of the light bulb tip icon is removed. Next, the logic flows to a decision block 142 where a test is made to determine if the trigger's tip condition is associated with a high priority. Also, if the determination at the decision block 138 had been false, the logic would have moved directly to the decision block 142. If the test at the decision block 142 determines that the tip condition is associated with a high priority, the logic will advance to a block 144 where a tip message for the trigger is formatted for a tip balloon. The logic moves to a block 148 and the formatted tip message is immediately displayed to the user in a tip balloon. Next, the logic steps to the return block and rejoins the flow of logic illustrated in FIG. 4A.

Alternatively, if the determination at the decision block 142 had been false, the logic would have flowed to a block 146 where a light bulb tip icon would be displayed adjacent to an object related to the trigger tip condition. In the case where the condition is not triggered by a particular object in the currently displayed slide, the present invention will position the light bulb tip icon at a default position in the current view of the displayed slide. The display of the light bulb tip icon may be delayed for a predetermined interval, e.g., 2 seconds, so that the display of the tip icon will not flash off and on while the user is in the process of editing an object that may temporarily correspond to a condition associated with a tip. The logic leaves the block 146 and moves to the return block and resumes the logical flow illustrated in FIG. 4A.

Turning to FIG. 6, the processing of the selection of the light bulb tip icon at the block 116 (shown in FIG. 4A) is illustrated in greater detail. Moving from a start block, the logic flows to a block 150 and the display of the selected light bulb tip icon is removed by the presentation program. At a block 152, a tip message is formatted for the condition that caused the present invention to display the light bulb tip icon. Next, at a block 154, the formatted tip message is displayed to the user in a tip balloon. The logic advances to a return block and rejoins the logic flow illustrated in FIG. 4A.

In FIG. 7, the processing of the selection of the tip balloon at the block 120 (shown in FIG. 4A) is illustrated in greater detail. Stepping from a start block, the logic moves to a decision block 156 where a test is made to determine if a control has been selected in the tip balloon, such as an action button or a check box, that causes the display of help information related to the tip condition. If so, the logic flows to a block 158 where the help information in a separate window is displayed to the user along with the tip balloon, e.g., a help window facility may be called by the present invention to display help information related to the tip condition in a separate window adjacent to the display of the tip balloon. Next, the logic steps to a return block and resumes the main logic flow illustrated in FIG. 4A.

Alternatively, if the test at the decision block 156 had been false, the logic would have moved to a block 160 and the display of the tip balloon would be removed. Flowing to a decision block 162, a test is made to determine if the current tip condition is selected to be disabled. If so, the logic moves to a block 164 and the current tip is disabled in the user profile.

The user profile may be employed to identify tips and disable entire categories of tips, as well as individual tips. An update to the user profile may be selected with a check box in the tip balloon (as shown in FIG. 2B) so that the user may alter the user profile regardless of any other action that is taken in the tip balloon such as correcting an identified tip condition and displaying additional help.

While the user profile is preferably stored in a registry for the operating system, it will be appreciated that other suitable locations for storing the user setting information, such as an initialization (.ini) file, can be used. In one embodiment, an entire category of tips may be automatically enabled based on the usage of a feature of the presentation program. For example, if the present invention detects that the user is frequently converting slides into a hypertext mark-up language (HTML) file, the category of tips associated with HTML usage would be automatically enabled. Also, the present invention may automatically set specific parameters in the user profile. For example, if the PA facility determines that the user employs version 4.0 of the Internet Explorer (IE) browser, the present invention could automatically set default parameters indicating that any exported HTML file should not be targeted to a higher browser version than 4.0 for IE. Preferably, the user could override default parameters set by the logic of the PA facility.

The usage of other application programs by the user may be monitored and stored in the user profile for determining the categories of tips that may be relevant to a user that regularly employs several different application programs. For example, a user may employ a word processing program to compose text that the user later retypes into a slide show presentation created with a presentation program. If so, the PA facility could use this "cross application" program behavior to provide tips to the user on how to build a slide show presentation based on text previously entered into a word processing document. Additionally, the present invention could monitor and store the user's employment of an "Answer Wizard" facility in the user profile so that tips could be automatically enabled for categories of information previously accessed by the user with the "Answer Wizard" facility. In one embodiment, the "Answer Wizard" facility is integrated with the OA facility for providing helpful information to queries by the user.

The present invention also monitors the user's actions in order to determine the proficiency of the user. The level of complexity for the displayed tips is adjusted and based on the user's level of proficiency. For example, most common and low priority editing tips could be disabled for a proficient user, while tips on better use of content and presenting an effective slide show presentation might remain enabled. Preferably, the present invention allows for sub-categories of proficiency levels. For example, the user may be classified as an expert at creating drawings and a novice at presenting a slide show presentation to others.

Also, the present invention may be used to calculate a difference between the current user's speed at using the features of the presentation application and an average user speed to determine if the calculated difference is greater than a positive predetermined value, i.e., the current user speed is faster than the average user speed by some factor. If true, the user is considered to be in an urgent mode and the conditions for displaying at least some of the lower priority tips could be disabled in the user profile based on their priority, while higher priority tip conditions would remain enabled. Also, the average user speed could be recalculated as the current user speed with the result being stored as a new average user speed in the user profile.

Returning to the logic illustrated at the block 164 in FIG. 7, the logic advances to a decision block 166 where a test is made to determine if the user selected the automatic correction of the error associated with the tip condition. Also, if the test at the decision block 162 had been false, the logic would have moved directly to the decision block 166. If the determination at the decision block 166 is true, the logic moves to a block 168 and the error associated with the tip condition is automatically corrected by the present invention. Leaving the block 168, the logic advances to a block 170 where the state of the tip condition is updated. Also, if the determination at the decision block 166 had been false, the logic would have flowed directly to the block 170. In either case, the logic moves from the block 170 to the return block and rejoins the logic flow illustrated in FIG. 4A.

Figure 8:
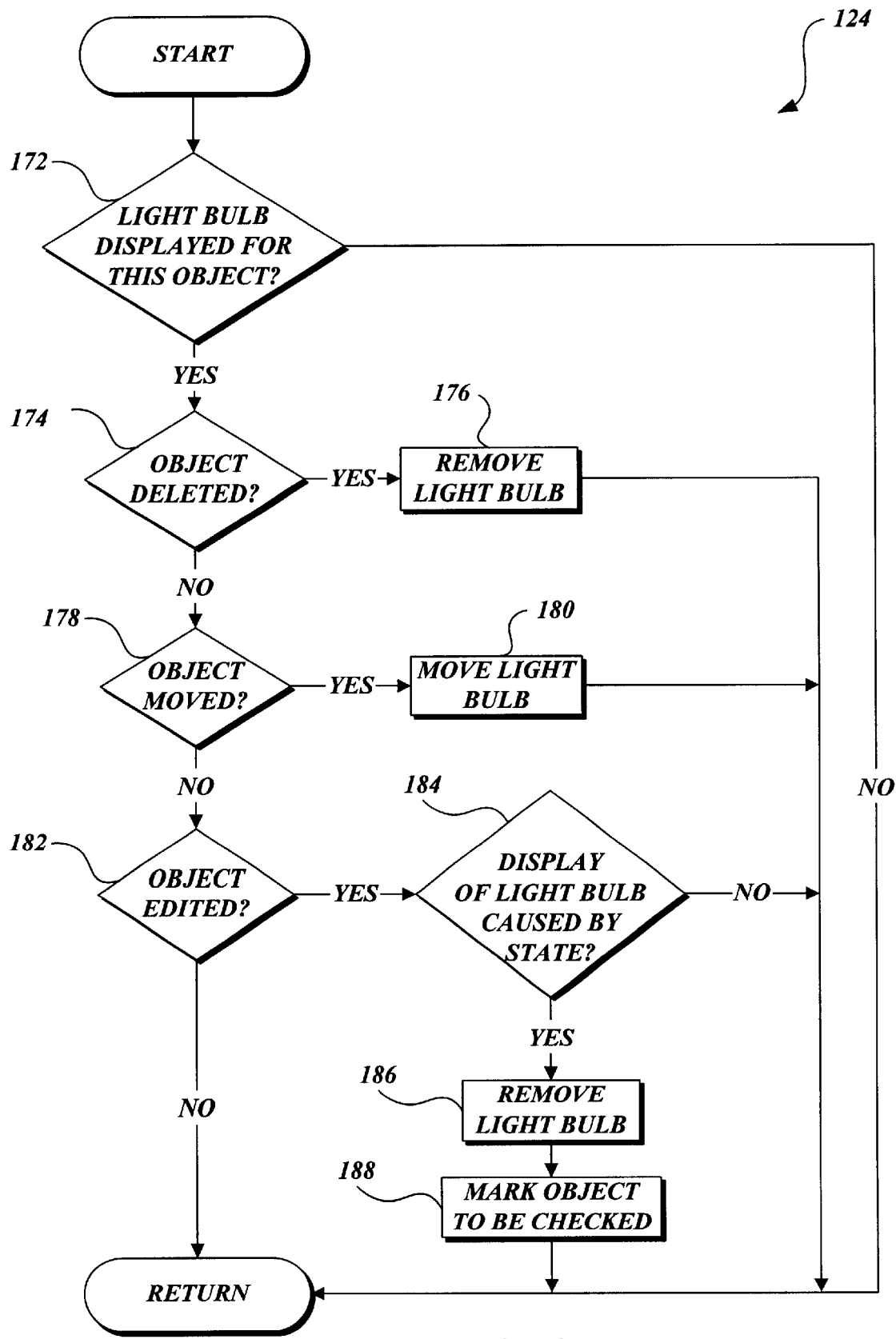
FIG. 8 is a flow diagram illustrating in detail the processing of a changed object as shown in FIG. 4A.

Turning to FIG. 8, the processing of a change to an object, e.g., editing, moving or deleting the object, at the block 124 (shown in FIG. 4A) is illustrated in detail. Stepping from a start block, the logic moves to a decision block 172 where a test is made to determine if a light bulb tip icon is currently displayed for a condition of the changed object. If false, the logic jumps to a return block and returns to the logic flow illustrated in FIG. 4A. However, if the determination at the decision block 172 is true, the logic steps to a decision block 174 to determine if the changed object is deleted. If so, the logic flows to a block 176 where the present invention causes the removal of the display of the light bulb tip icon corresponding to a tip condition of the changed object. Next, the logic advances to the return block and returns to the main logic flow illustrated in FIG. 4A.

Alternatively, if the test in the decision block 174 had been negative, the logic would have moved to a decision block 178. At the decision block 178, a test is made to determine whether the changed object had been moved to a new position. If affirmative, the logic steps to a block 180 and the disposition of the light bulb tip icon is changed (moved) to another position that is more closely related to the new position of the changed object. From the block 180, the logic steps to the return block and rejoins the logical flow of the present invention illustrated in FIG. 4A.

If the determination at the decision block 178 had been false, the logic would have flowed to a decision block 182. At the decision block 182, the logic performs a test to determine if the changed object was edited. If false, the logic moves to the return block and returns to the logic flow illustrated in FIG. 4A. However, if the determination at the decision block 182 is true, the logic will advance to a decision block 184 where a test is performed to determine if the display of the light bulb tip icon associated with the changed object is caused by a state based tip condition. If yes, the logic steps to a block 186 and the present invention will remove (close) the display of the light bulb tip icon corresponding to a tip condition associated with the changed object. The logic flows to a block 188 and the present invention will mark the changed object to be checked by the state based tip condition logic. Next, the logic will step to the return block and rejoin the main flow of logic illustrated in FIG. 4A. Also, if the determination at the decision block 184 had been false, the logic would have jumped directly to the return block where if rejoins the logic illustrated in FIG. 4A.

Figure 9:
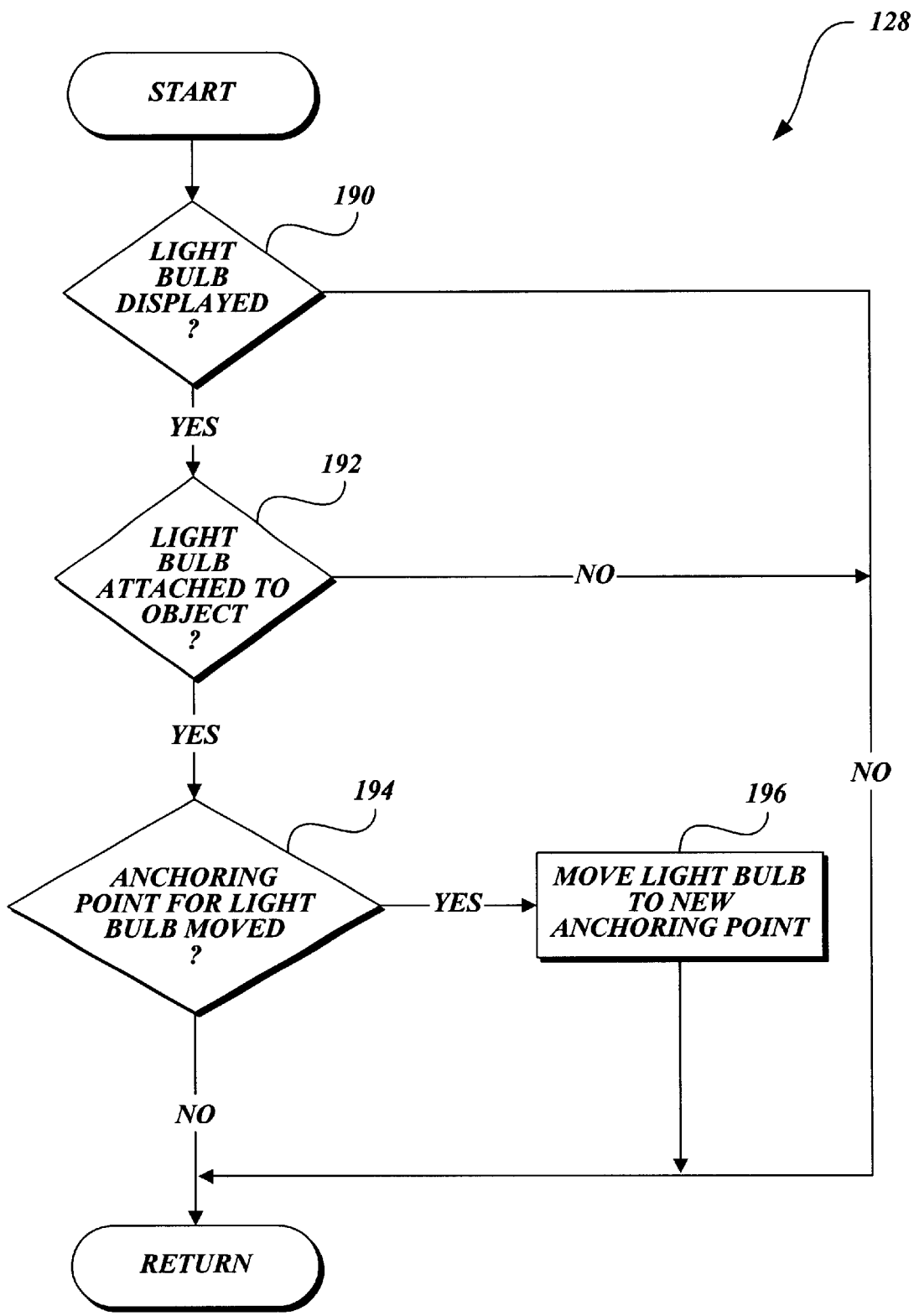
FIG. 9 is a flow diagram illustrating in detail the change of view for a currently displayed slide as shown in FIG. 4B.

FIG. 9 illustrates in greater detail the processing of a change from an initial view to a new view of a currently displayed slide at the block 128 as shown in FIG. 4B. Moving from a start block, the logic steps to a decision block 190 where a test is made to determine if a tip condition is causing the present invention to display a light bulb tip icon in the new view which was previously displayed in the initial view. If no, the logic jumps directly to a return block and rejoins the logic flow of the present invention illustrated in FIG. 4B. However, if the test at the decision block 190 is affirmative, the logic will flow to a decision block 192 where a test will be made to determine if the light bulb tip icon is attached to an object displayed in the new view. If false, the logic will jump directly to the return block and the logic will return to the main logic flow shown in FIG. 4B.

Alternatively, if the determination at the decision block 192 is true, the logic will step to a decision block 194 where a test will be made to determine if changing from the initial view to the new view of the currently displayed slide causes the present invention to move anchoring point of the light bulb tip icon to a new position so that the light bulb tip icon is visible in the new view. If so, the logic advances to a block 196 where the light bulb tip icon is attached to another anchoring point associated with the object at the new position in the new view. Next, the logic advances to the return block and rejoins the main logic flow of the present invention illustrated in FIG. 4B.

Figure 10:
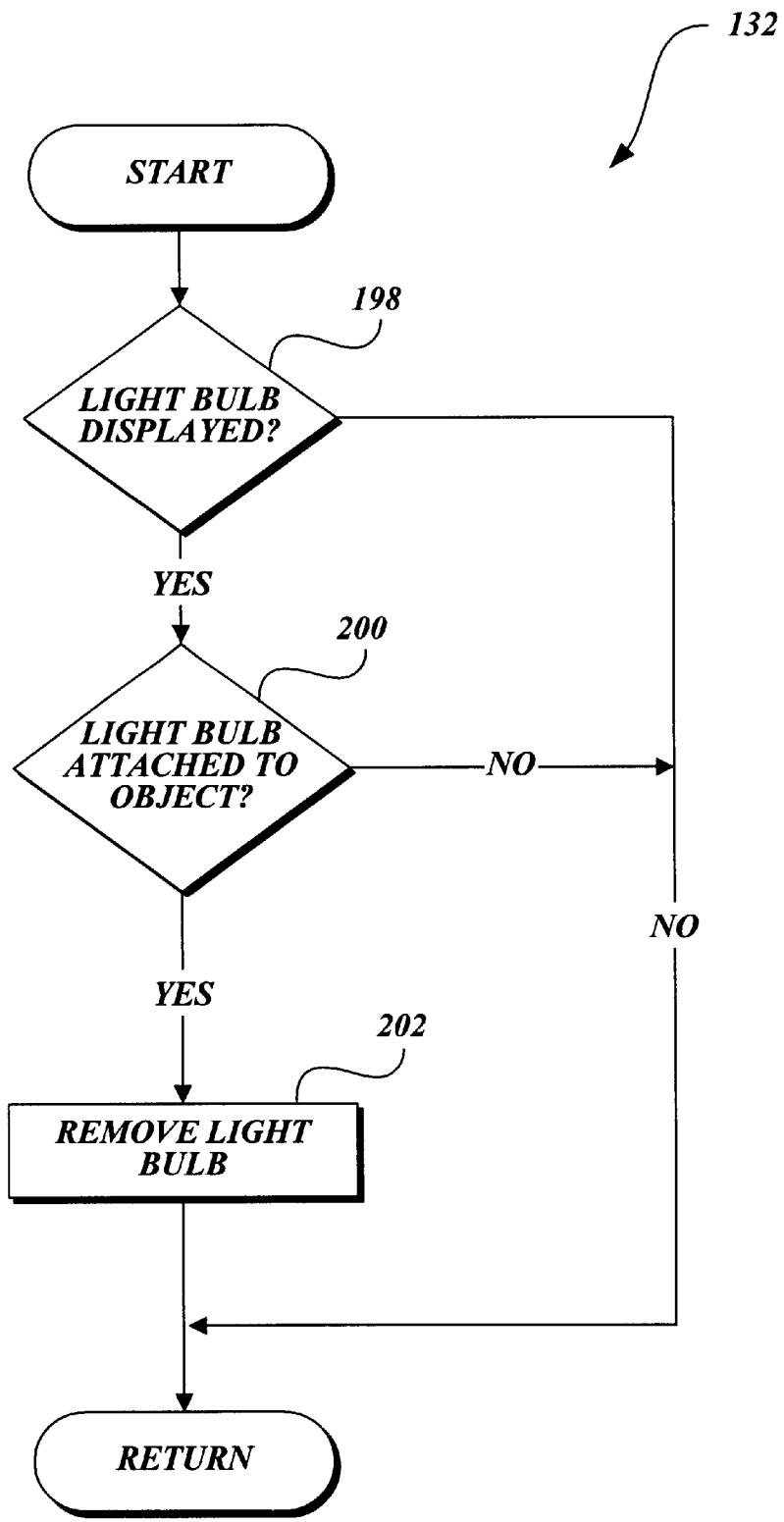
FIG. 10 is a flow diagram illustrating in detail the process of changing a currently displayed slide to another display of another slide as shown in FIG. 4B.

In FIG. 10, the logical steps at the block 132 (shown in FIG. 4A) for processing the change from an initially displayed slide to the display of another (new) slide is illustrated in greater detail. Advancing from a start block, the logic flows to a decision block 198 where a test is made to determine if the light bulb tip icon is displayed. If negative, the logic jumps directly to a return block and rejoins the main logic flow shown in FIG. 4B. However, if the test at the decision block 198 is affirmative, the logic will move to a decision block 200 where a test is made to determine if the light bulb tip icon is attached to an object that is disposed in the initially displayed slide. If false, the logic moves directly to the return block and returns to the logic flow of the present invention illustrated in FIG. 4B.

Alternatively, if the determination at the decision block 200 was true, the logic would step to a block 202. At the block 202, since the initially displayed slide containing the object is no longer displayed, the present invention removes the light bulb tip icon. Next, the logic moves to the return block and rejoins the main flow logic shown in FIG. 4B.

Figure 11A:
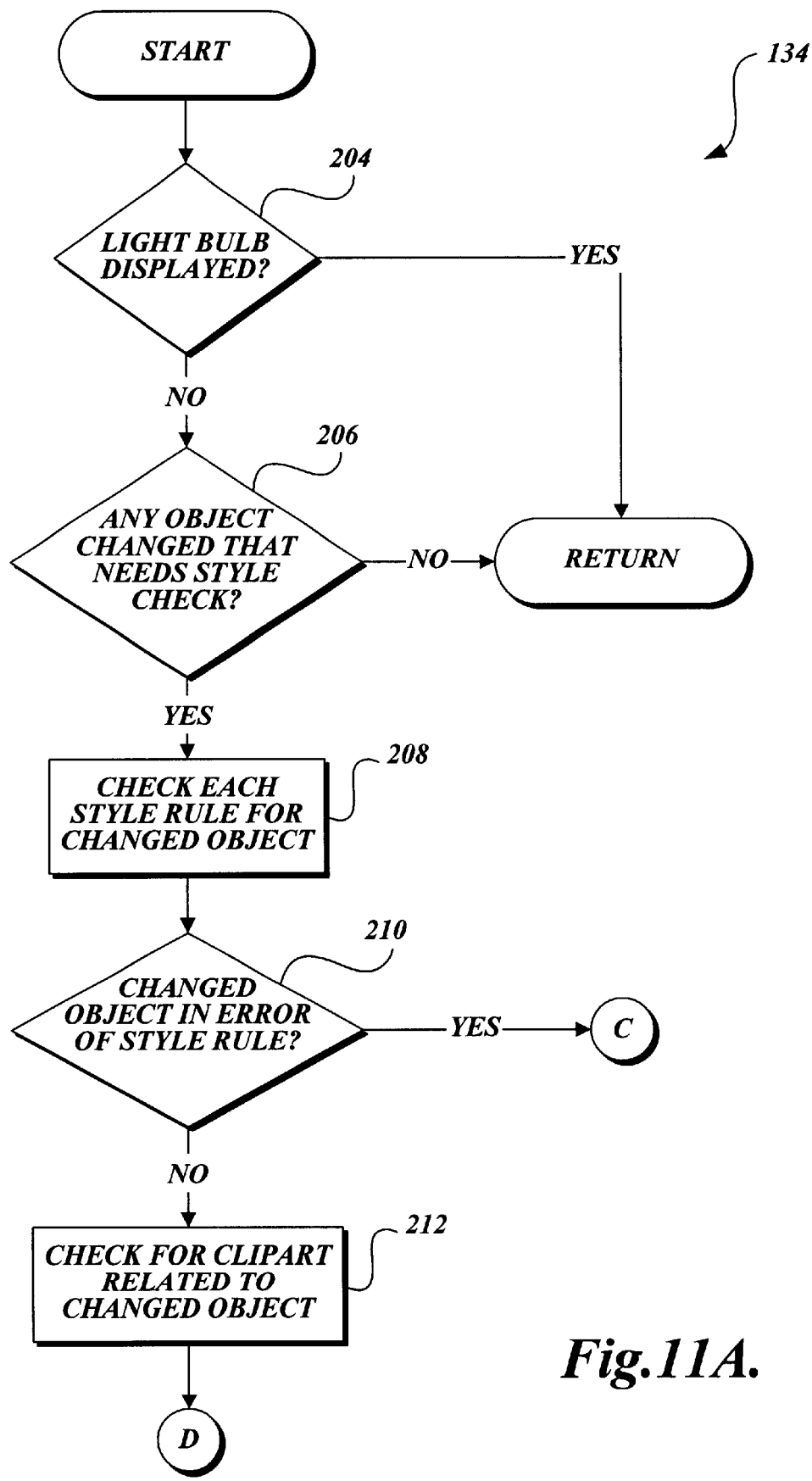
FIGS. 11A–11B illustrate a flow diagram in detail the updating of the state tip condition for objects in a currently displayed slide as shown in FIG. 4B.
Figure 11B:
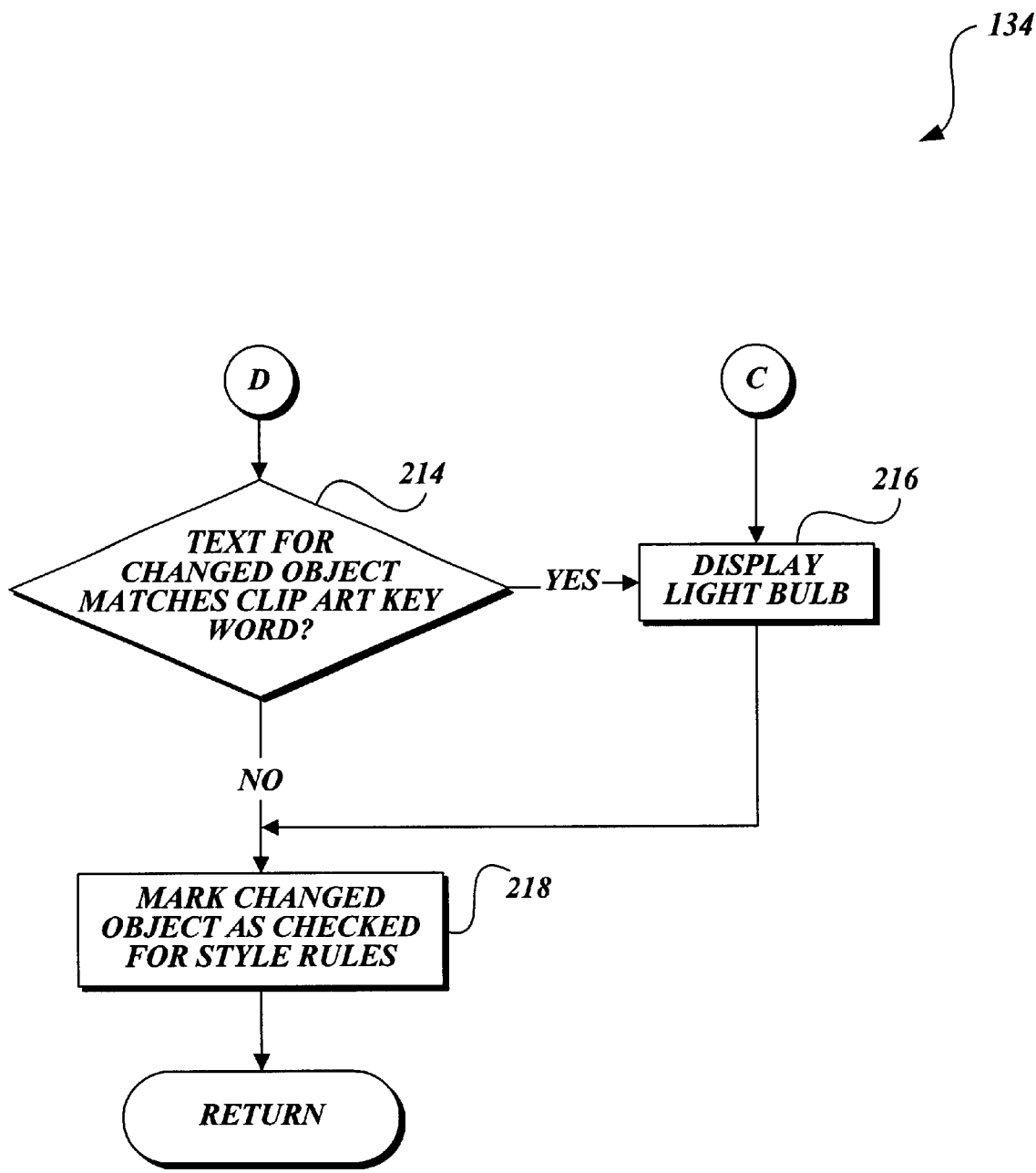

Turning to FIGS. 11A and 11B, greater detail is presented for the logic at the block 134 (FIG. 4B) for checking the state based tip conditions of objects in the currently displayed slide. State tip conditions often have a relatively low priority and tend to be automatically processed in the background when the user has not used the presentation program for at least a predetermined period of time, e.g., 100 milliseconds. In the present invention, at least two categories of state tip conditions are checked, i.e., style and clip art. Also, it will be appreciated that different types and/or additional categories of tip conditions may be automatically checked by the present invention.

Stepping from a start block, the logic moves to a decision block 204 where a test is made to determine if the light bulb tip icon is currently displayed. If true, the logic jumps directly to a return block and rejoins the main logic of the present invention shown in FIG. 4B. However, if the determination is false, the logic flows to a decision block 206 where a test is made to determine if any changed object should be checked for style with a set of style based rules. If negative, the logic moves to the return block and rejoins the main logic flow.

Alternatively, if the determination at the decision block 206 is affirmative, the logic will advance to a block 208 where the present invention will sequentially check each style rule with the content (text) of the changed object in a determined order. The logic will sequentially check the text of the changed object with each style rule until either the text of the changed object is found in error of a style rule or all of the style rules are checked. Preferably, the process of checking style rules involves invoking an existing "Style Checker" facility integrated with the OA facility. The "Style Checker" facility is primarily employed to identify style tip conditions such as style and punctuation for text objects in the currently displayed slide.

When either of the two conditions at the block 208 are met, the logic moves to a decision block 210. At the decision block 210, a test is performed to determine if the changed object is in error of a checked style rule. If so, the logic moves to a block 216 as illustrated in FIG. 11B. At the block 216, the light bulb tip icon is attached to the changed object and the tip icon is displayed by the present invention. Also, a predetermined delay, e.g., 1 second, may be provided so that the display of the light bulb tip icon does not flash off and on while the user is editing the changed object. The logic flows to a block 218 where the changed object is marked as checked for style against at least a portion of the set of style rules. In this way, the present invention keeps track of the style rules actually checked with the text of the changed object and it will continue checking the changed object for any remaining style rules when the user dismisses a tip condition associated with a checked style rule. However, if the user selects the automatic correction of the tip condition in the tip balloon or "changes" the changed object in some way, the present invention will check the changed object's text with the entire set of style rules again. This aspect of the present invention prevents the tip icon from being displayed multiple times for the same error unless the changed object is changed again. Next, the logic advances to the return block and rejoins the logic flow shown in FIG. 4B.

Also, if the test at the decision block 210 was false, the logic would move to a block 212. At the block 212, the present invention checks the text of the changed object for clip art that may be related to the changed object. The logic will sequentially check the text of the changed object with each key word(s) for each piece of clip art in a clip art library until either the changed object substantially matches a key word or the key words for all of the pieces in the clip art library are checked.

In one embodiment, the text of the changed object is checked for potential clip art recommendations (tips) using an "Auto Clip Art" facility that is integrated with the OA facility. The "Auto Clip Art" facility may be employed to provide a recommendation for a piece of clip art stored in a clip art library based on the text of the changed object in the currently displayed slide. If desired, a graphical user interface for the "Auto Clip Art" facility may be employed to display the clip art recommendations to the user.

Returning to the logic at the block 212, when either of the two tip conditions are met, the logic will move to a decision block 214. At the decision block 214, a test is made to determine if the text in the changed object substantially matches a key word for a piece of clip art. If so, the logic moves to a block 216 where the light bulb tip icon is attached to the changed object and displayed by the present invention. The logic moves from the block 216 to a block 218 where it performs substantially the same logical steps discussed above. Alternatively, if the test at the decision block 214 is false, the logic will step directly to the block 218 and perform substantially the same logical steps discussed above.

It is also envisioned that the present invention may employ a buffer for storing a plurality of conditions associated with tips for a currently displayed slide. The types of buffer that may be employed with the present invention include first in first out (FIFO), last in first out (LIFO) and an intelligent mechanism for ordering tip conditions in the buffer according to weighted characteristics such as type, category and priority value.

Although not shown, another embodiment of the present invention may include a visual display, e.g., a thumbnail display, that illustrates what changes will be made to the currently displayed slide if the automatic correction of the tip condition is selected. Yet another embodiment of the present invention may include a "Tool Tip" facility integrated with the OA facility. The present invention would employ the "Tool Tip" facility to cause the display of text identifying the type and/or category of the tip condition when a pointing mechanism is positioned over the graphic image of a tip icon that corresponds to the condition associated with the tip.

A further embodiment of the present invention would provide batch (simultaneous) viewing of every tip for every tip condition in a currently displayed slide. The present invention could also control the batch viewing of tips for a displayed slide according to type, category and priority. Another embodiment would provide tips for automatically correcting multiple tip conditions at the same time. Additionally, it is envisioned that an "Apply to All" option in a tip message window may be provided for causing the present invention to automatically correct every tip condition in the displayed slide and/or presentation.

While the preferred embodiment of the invention has been illustrated and described, it will be appreciated that within the scope of the appended claims various changes can be made therein without departing from the spirit of the invention.

The embodiments of the invention in which an exclusive property or privilege is claimed are defined as follows:

1. In a computing device, a method for automatically indicating tips for conditions detected in an application program, the method comprising:

detecting an occurrence of a condition associated with a tip in the application program;

determining that the tip is relevant to the- current usage of the application program; and displaying the tip on an area of the user interface so that the condition may be acknowledged, the conditions associated with the tips being stored in a buffer so that each tip associated with the condition stored in the buffer is individually displayed, the buffer providing an order for storing tips that includes first in first out (FIFO), last in first out (LIFO), and a determined order based on at least one characteristic of each tip.

2. The method of claim 1, wherein detecting the occurrence of the condition further comprises identifying a type for the condition including event and state.

3. The method of claim 2, wherein each condition has a priority value.

4. The method of claim 3, wherein the priority value is a predetermined value.

5. The method of claim 3, wherein the priority value is automatically determined according to the state condition of the application program.

6. The method of claim 3, wherein a high priority value associated with the condition will cause the immediate display of the tip.

7. The method of claim 3, further comprising:

displaying a graphic image at a location adjacent to an object associated with a condition that does not have a high priority value; and when the graphic image is selected, causing the tip associated with the condition to be displayed and the graphic image to not be displayed.

8. The method of claim 7, wherein the graphic image is an icon.

9. The method of claim 8, wherein the icon is translucent.

10. The method of claim 7, wherein the graphic image is selectable and sized greater than a minimum size that is unobtrusive to the user.

11. The method of claim 7, wherein the displaying of the graphic image is delayed by a determined time interval.

12. The method of claim 3, wherein a medium priority value associated with the condition causes the immediate display of the graphic image.

13. The method of claim 2, wherein a state condition of the application program is employed to determine a time interval for causing the display of the graphic image when the application is idle.

14. The method of claim 2, further comprising:

disabling at least one type of condition; and displaying only tips associated with types of conditions that are not disabled.

15. The method of claim 2, wherein the event of the type for the condition includes printing errors and edit commands.

16. The method of claim 2, wherein the state of the type for the condition is detected with an idle loop that performs at least one of style checking and clip art checking.

17. The method of claim 1, further comprising displaying a description indicating how to perform an action that will correct the condition associated with the tip.

18. The method of claim 1, further comprising disabling a display of the tip.

19. The method of claim 1, wherein the determined order is based on tip characteristics that include type, category, priority value, and length of time stored in the buffer.

20. The method of claim 1, wherein the buffer is associated with a section of data.

21. The method of claim 20, wherein the section of data is a slide in a slide show presentation.

22. The method of claim 1, wherein detecting the occurrence of the condition further comprises identifying a category of the condition that includes edit, style, clip art and presentation.

23. The method of claim 22, further comprising:

disabling at least one category of the condition; and displaying only tips associated with the categories of the conditions that are not disabled.

24. The method of claim 1 further comprising a user profile for the user.

25. The method of claim 24, wherein the user profile includes a proficiency level of the user.

26. The method of claim 24, wherein the user profile includes a measure of the user's urgency in completing tasks with the application program.

27. The method of claim 26, wherein the measure is a difference between a current speed of the user employing the application program and an average speed.

28. The method of claim 24, wherein the user profile includes a list that identifies each application program that is currently available to the user.

29. The method of claim 24, wherein the user profile includes a list identifying a help request previously made by the user.

30. The method of claim 24, wherein the user profile includes a list identifying each application used by the user.

31. The method of claim 24, further comprising modifying the user profile based on an action of the user, the user profile being employed to determine when the tip associated with the condition is relevant to the user.

32. The method of claim 1, further comprising:

displaying a control with the tip, the control providing for the automatic correction of the condition associated with the tip; and automatically correcting the condition associated with the tip and removing the display of the control and the tip when the control is selected.

33. The method of claim 1, further comprising:

displaying a control with the tip, the control providing for the display of additional help information associated with the condition; and automatically displaying the additional help information when the control is selected.

34. The method of claim 33, further comprising displaying a preview that illustrates what changes will be made if the control is selected.

35. The method of claim 1, further comprising displaying text that identifies the type of the condition when a pointing mechanism is positioned over a graphic image associated with the condition for the relevant tip.

36. The method of claim 1, further comprising a control that causes the simultaneous display of every relevant tip associated with each current state and tip condition in the application program.

37. The method of claim 36, wherein the control provides for selecting the type and priority of the relevant tip to be displayed.

38. The method of claim 1, further comprising a control that provides for automatically correcting a plurality of conditions associated with the tip.

39. A computer-readable medium having computer-executable instructions for performing the steps recited in any one of claims 1–18 and 19–16.

40. A system for automatically indicating tips for conditions detected in an application program, the system comprising:

(a) a display for displaying a tip;

(b) a processor for implementing the logical instructions, including:
   (i) detecting an occurrence of a condition associated with the tip in the application program;
   (ii) determining that the tip is relevant to the current usage of the application program; and
   (iii) displaying the tip on an area of the user interface so that the condition may be acknowledged, the conditions associated with the tips being stored in a buffer so that each tip associated with the condition stored in the buffer is individually displayed, the buffer providing an order for storing tips that includes first in first out (FIFO), last in first out (LIFO), and a determined order based on at least one characteristic of each tip.

* * * * *

UNITED STATES PATENT AND TRADEMARK OFFICE
CERTIFICATE OF CORRECTION

PATENT NO.   : 6,542,163 B2  
DATED        : April 1, 2003  
INVENTOR(S)  : D.P.H. Gorbet et al.

It is certified that error appears in the above-identified patent and that said Letters Patent is hereby corrected as shown below:

Column 1,  
Line 34, after "slide show presentation." insert a new paragraph beginning with the sentence -- A presentation program.... --

Column 4,  
Line 45, "FIG. 4A," should read -- FIG. 4A; --

Column 7,  
Line 13, "aid" should read -- and --  
Line 44, "typical'y" should read -- typically --

Column 17,  
Line 18, "the- current" should read -- the current --

Column 19,  
Line 17, "claims 1-18 and 19-16." should read -- claims 1-9 and 12-31. --

Signed and Sealed this

Twenty-first Day of October, 2003

JAMES E. ROGAN  
*Director of the United States Patent and Trademark Office*